UNITED STATES PATENT OFFICE.

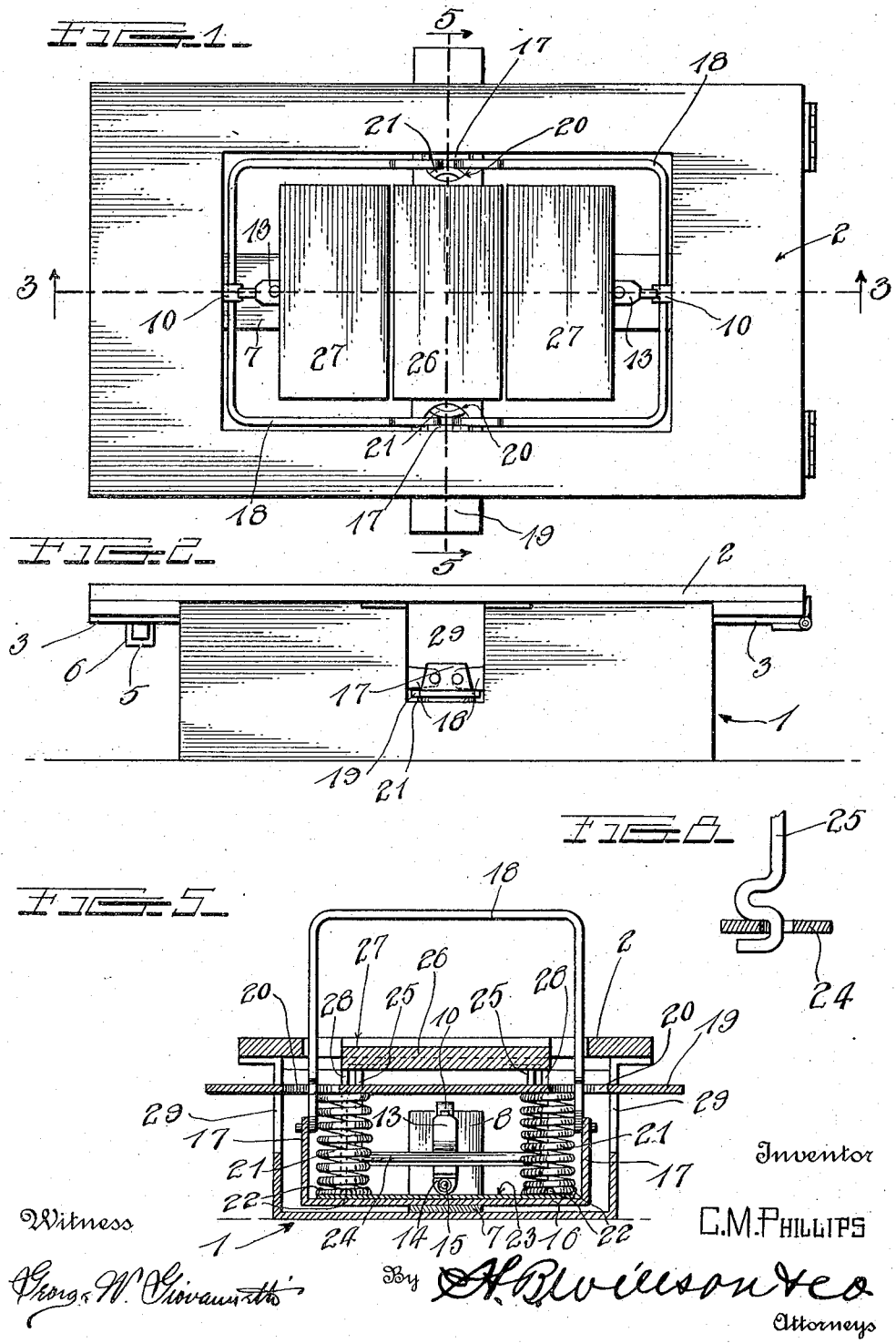
C. M. PHILLIPS.
TRAP.
APPLICATION FILED MAY 22, 1916.
1,191,909.
Patented July 18, 1916.
2 SHEETS—SHEET 1.

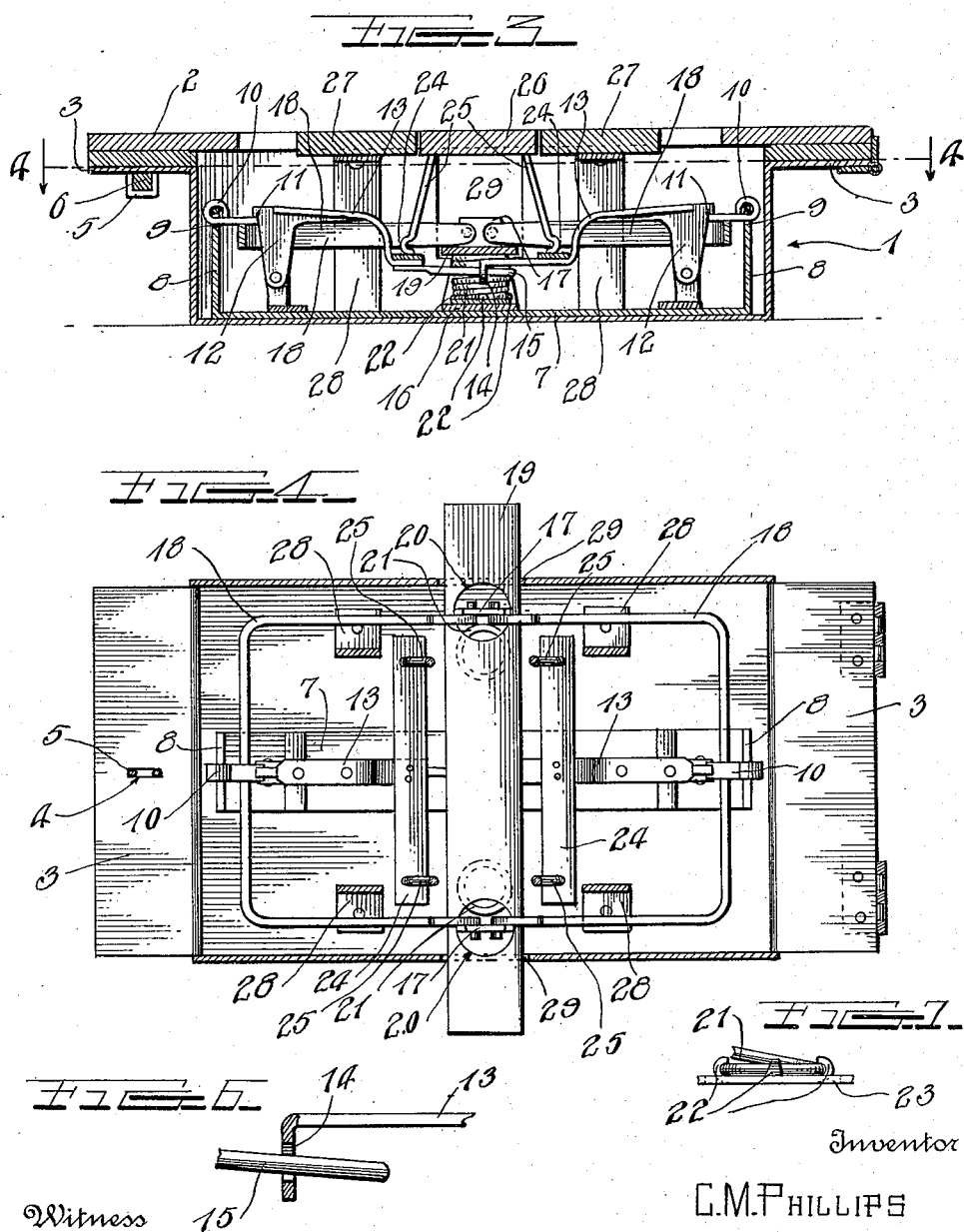

CHARLES M. PHILLIPS, OF HURLOCK, MARYLAND.

TRAP.

1,191,909.

Specification of Letters Patent.

Patented July 18, 1916.

Application filed May 22, 1916. Serial No. 99,196.

*To all whom it may concern:*

Be it known that I, CHARLES M. PHILLIPS, a citizen of the United States, residing at Hurlock, in the county of Dorchester and State of Maryland, have invented certain new and useful Improvements in Traps; and I do declare the following to be a full, clear, and exact description of the invention, such as will enable others skilled in the art to which it appertains to make and use the same.

My invention is an improved trap designed for trapping animals and the object thereof is to provide a simply constructed and inexpensive device which regardless of these characteristics will be highly efficient and durable.

With the foregoing general object in view, the invention resides in numerous novel features of construction and in unique combinations of parts to be hereinafter fully described and claimed, the descriptive matter being supplemented by the accompanying drawings which constitute a part of this application, and in which:

Figure 1 is a top plan view of the improved trap; Fig. 2 is a side elevation thereof; Fig. 3 is a central vertical longitudinal section on the plane of the line 3—3 of Fig. 1; Fig. 4 is a horizontal section taken on the plane indicated by the line 4—4 of Fig. 3; Fig. 5 is a vertical transverse section taken on the plane of the line 5—5 of Fig. 1; Fig. 6 is a detail vertical section showing the connection between the two keeper releasing arms; Fig. 7 is a fragmentary side elevation disclosing the manner in which the jaw closing springs are anchored; and, Fig. 8 is an enlarged detail section disclosing the manner in which the supporting legs of the depressible platform are mounted at their lower ends.

In specifically describing the structure shown in the drawings above briefly described, similar characters will be placed on corresponding parts throughout the several views and reference will be herein made to the numerous elements by their respective indices. To this end, the numeral 1 designates a rectangular casing preferably having a hinged top 2 in the form of a rectangular frame. The casing 1 may be constructed in any suitable manner but will preferably be formed of sheet metal with flanges 3 projecting horizontally outward from its ends, it being to one of these flanges that the frame 2 is hinged, while the other flange will usually be provided with an opening 4 through which a staple or the like 5 depends from the free end of the frame, a wedge 6 being driven through said staple to normally hold the frame 2 in closed position. In some instances, the casing 1 may be water tight to permit it to serve as a float for supporting all of the working parts of the trap in case the device is to be used for trapping animals which inhabit bodies of water.

Secured by rivets or the like to the bottom of the casing 1 is a metal bar 7 having its ends bent upwardly to form posts 8 having apertures 9 in their upper ends within which the outer ends of locking fingers 10 are pivoted, the inner ends of the latter being adapted for reception in notches 11 at the upper ends of keepers 12, the latter being pivoted to ears or the like on the bar 7 in any preferred manner. Keeper releasing arms 13 are secured to the upper ends of the keepers 12 and are extended downwardly and inwardly, one of said arms preferably having its inner end bent downwardly at 14 to form an ear, while a longitudinally extending pin 15 is secured to the inner end of the other arm 13, the free end of said pin being received loosely in an opening in said ear whereby the two arms 13 will be maintained in longitudinal alinement.

A transverse plate 16 is riveted or otherwise secured to the upper side of the bar 7 at the center thereof, the ends of this plate being bent upwardly to provide ears 17 to which the ends of a pair of U-shaped jaws 18 are pivoted, these jaws being adapted to be swung to horizontal positions and held in this manner by the fingers 10 when setting the trap but being moved upwardly toward each other when an animal treads upon a depressible platform to be described.

A jaw operating bar 19 extends above the plate 16 and is formed with openings 20 through which the arms of the jaws 18 pass, a pair of coil springs 21 being provided for raising said bar when the jaws 18 are released, whereupon said jaws will be forced upwardly toward each other. The springs 21 are preferably anchored at their lower ends by claws 22 struck upwardly from the ends of a sheet metal plate 23 which is secured in contact with the upper side of the plate 16.

A pair of transverse bars 24 are secured at their centers to the inner ends of the keeper releasing arms 13 and legs 25 rise from the ends of said bars to a depressible platform 26 disposed within and flush with the top of the frame 2 when the trap is set, said platform being then in horizontal alinement with a pair of fixed platforms 27 supported within the frame by legs 28 secured to the bottom of the casing 1. Sufficient space prevails between all of the platforms and the inner side of the frame to permit the jaws 18 to swing upwardly when released, such jaws being folded downwardly into said casing when set.

In use the improved trap may be placed at any point of vantage whereupon the top or frame 2 will be raised to permit depression of the bar 19, the opposite ends of this bar preferably projecting through openings 29 in the sides of the casing 1 to permit the operator to force downwardly thereon with his feet. This compresses the springs 21 and permits the jaws 18 to fold downwardly whereupon they may be locked in their lowered positions by passing the fingers 10 thereover and engaging them with the keepers 11. With the parts standing in this manner, the inner ends of the arms 13 will be raised with the result that the platform 26 is disposed to its uppermost position. The frame 2 will now again be lowered and preferably fastened and this having been done, the bait, if any be used, will be disposed on the platform 26. When now an animal treads upon this platform, it will be depressed with the result that the keepers 11 will release the fingers 10, thereby allowing the springs 21 to force the bar 19 upwardly to bring the jaws 18 toward each other around the leg of the animal which rests on the platform 26.

I have hereinbefore stated that in some instances the casing 1 may be made watertight to permit floating thereof, but if the frame 2 and the platforms 26 and 27 be made of buoyant material such as wood, they will serve to float the device with said casing and the interior working parts submerged.

From the foregoing, taken in connection with the accompanying drawings, the construction, manner of operation and advantages of the improved trap will be readily understood without requiring a more extended explanation, but in conclusion I will state that although I have shown and described certain specific details of construction for accomplishing probably the best results, numerous changes may be made within the scope of the invention as claimed, without sacrificing the main advantages thereof.

If the improved trap is to be set on a body of water, the frame 2 and the platforms 26 and 27 will float the same, since these parts are constructed of wood or other buoyant material.

I claim:—

1. A trap comprising a casing having in its top an opening, a pair of posts rising from the bottom of said casing in spaced relation, a pair of locking fingers pivoted to said posts, a pair of U-shaped jaws adapted to be held in lowered position within the casing by said fingers, keepers for holding said fingers in operative position, keeper releasing arms extending inwardly toward each other from said keepers, a depressible platform within the opening in the top of the casing, legs rising from said keeper releasing arms and supporting said platform, and spring means for forcing the jaws upwardly toward each other when the aforesaid keepers are released by depression of the platform.

2. A trap comprising a casing having in its top an opening, a pair of posts rising from the bottom of said casing in spaced relation, a pair of locking fingers pivoted to said posts, a pair of U-shaped jaws adapted to be held in lowered position within the casing by said fingers, keepers for holding said fingers in operative position, keeper releasing arms extending inwardly toward each other from said keepers, a pair of transverse bars secured one to each of said keeper releasing arms, legs rising from said bars, a depressible platform carried by the upper ends of said legs and disposed within the opening in the top of the casing, and means for forcing the two jaws upwardly toward each other when the aforesaid keepers are released by depression of the platform.

3. A trap of the class described comprising a casing having in its top an opening, a metal bar secured to the bottom of said casing and having its ends bent upwardly to form a pair of spaced posts, a pair of locking fingers pivoted to the upper ends of said posts, a pair of U-shaped jaws adapted to be swung downwardly and held in lowered position by said fingers, a pair of keepers pivoted to and rising from the aforesaid bar to retain said fingers in operative position, a pair of keeper releasing arms secured to and extending inwardly toward each other from said keepers, a depressible platform disposed in the opening of the casing, legs depending from said platform to the aforesaid keeper releasing arms, and spring means for forcing the two jaws upwardly toward each other when the aforesaid fingers are released by depression of the platform.

4. A trap of the class described comprising a casing having in its top an opening, a metal bar secured to the bottom of said casing and having its ends bent upwardly to form a pair of spaced posts, a pair of locking fingers pivoted to the upper ends of said posts, a pair of U-shaped jaws adapted to be swung downwardly and held in lowered position by said fingers, a pair of keepers pivoted to and rising from the aforesaid bar to retain said fingers in operative position, a pair of keeper releasing arms secured to and extending inwardly toward each other from said keepers, a depressible platform disposed in the opening of the casing, legs depending from said platform to the aforesaid keeper releasing arms, a metal plate secured at its center to the center of the aforesaid bar and extending transversely thereof, said plate having upwardly turned ends to which the arms of the jaws are pivoted, a jaw operating bar having openings receiving said arms of the jaws, and spring means beneath said operating bar for forcing the same upwardly when the aforesaid keepers are released by depression of the platform.

In testimony whereof I have hereunto set my hand in the presence of two subscribing witnesses.

CHARLES M. PHILLIPS.

Witnesses:
ROLAND WEBSTER,
ALBERT STEVENS.

Copies of this patent may be obtained for five cents each, by addressing the "Commissioner of Patents, Washington, D. C."